United States Patent
Inoue et al.

(10) Patent No.: US 11,983,967 B2
(45) Date of Patent: May 14, 2024

(54) CONTROL APPARATUS, CONTROL METHOD, AND NON-TRANSITORY STORAGE MEDIUM

(71) Applicant: NEC Corporation, Tokyo (JP)

(72) Inventors: Hirofumi Inoue, Tokyo (JP); Shin Tominaga, Tokyo (JP); Shigeki Shinoda, Tokyo (JP); Yuzo Senda, Tokyo (JP); Shigeru Sekine, Tokyo (JP)

(73) Assignee: NEC CORPORATION, Tokyo (JP)

( * ) Notice: Subject to any disclaimer, the term of this patent is extended or adjusted under 35 U.S.C. 154(b) by 27 days.

(21) Appl. No.: 17/790,927

(22) PCT Filed: Jan. 21, 2020

(86) PCT No.: PCT/JP2020/001837
§ 371 (c)(1),
(2) Date: Jul. 5, 2022

(87) PCT Pub. No.: WO2021/149133
PCT Pub. Date: Jul. 29, 2021

(65) Prior Publication Data
US 2023/0033538 A1    Feb. 2, 2023

(51) Int. Cl.
*G07C 1/02*    (2006.01)
*G07C 11/00*    (2006.01)

(52) U.S. Cl.
CPC ............... *G07C 1/02* (2013.01); *G07C 11/00* (2013.01); *G07C 2011/04* (2013.01)

(58) Field of Classification Search
None
See application file for complete search history.

(56) References Cited

U.S. PATENT DOCUMENTS

| | | | |
|---|---|---|---|
| 2004/0172316 A1 | 9/2004 | Hale et al. | |
| 2009/0063205 A1 | 3/2009 | Shibasaki | |
| 2016/0300162 A1 | 10/2016 | Mcmanus | |
| 2020/0104757 A1* | 4/2020 | Molinari | G06Q 10/04 |

FOREIGN PATENT DOCUMENTS

| | | |
|---|---|---|
| GB | 2572560 A | 10/2019 |
| JP | 2007-025817 A | 2/2007 |
| JP | 2007-509393 A | 4/2007 |
| JP | 2016-224651 A | 12/2016 |
| WO | 2016/194770 A1 | 12/2016 |

OTHER PUBLICATIONS

Extended European Search Report for EP Application No. 20916058. 9, dated Nov. 8, 2022.
International Search Report for PCT Application No. PCT/JP2020/001837, dated Apr. 14, 2020.

* cited by examiner

*Primary Examiner* — Kristy A Haupt
(74) *Attorney, Agent, or Firm* — Sughrue Mion, PLLC (57) ABSTRACT

A control apparatus (2000) computes a waiting time index value for each of a plurality of gates (20) for entering an area (10). The control apparatus (2000) detects, from among the plurality of gates (20), a first gate (20) and a second gate (20) of which relation between the waiting time index values satisfies a first criterion. Herein, the waiting time index value of the first gate (20) is greater than the waiting time index value of the second gate (20). The control apparatus (2000) causes a terminal (30) associated with the first gate (20) to output priority use information, which allows prioritized use of the second gate (20).

18 Claims, 4 Drawing Sheets

CONTROL APPARATUS, CONTROL METHOD, AND NON-TRANSITORY STORAGE MEDIUM

This application is a National Stage Entry of PCT/JP2020/001837 filed on Jan. 21, 2020, the contents of all of which are incorporated herein by reference, in their entirety.

TECHNICAL FIELD

The present invention relates to control of a waiting line.

BACKGROUND ART

There is an area, such as a security area in an airport, which is controlled in such a way that users enter the area by passing through a predetermined entrance (gate) in order. For such an area, a waiting line of users is formed in front of a gate, and a user who wants to enter the area waits in the waiting line.

As a prior art document, Patent Document 1 discloses a method for managing a waiting line of users. In Patent Document 1, waiting lines for an attraction are provided, which are a first waiting line for a user who has not made a reservation and a second waiting line for a user who has made a reservation, and a user lining up in the second waiting line (specifically, a user making a reservation) is given priority to use the attraction. Further, waiting time in a case where a user lines up in the first waiting line from a current time and a time when the user can use the attraction in a case where the user makes a reservation from now on are respectively provided to the user. By being provided with such information, a user can choose whether to immediately get in the first waiting line and use the attraction or to make a reservation for the attraction from now on (leave the attraction until later) and move on to another attraction. In such a way, waiting lines are leveled between the attractions.

RELATED DOCUMENT

Patent Document

[Patent Document 1] Japanese Patent Application Publication (Translation of PCT Application) No. 2007-509393

SUMMARY OF THE INVENTION

Technical Problem

In Patent Document 1, leveling of waiting lines among a plurality of areas is attempted on a premise that the number of entrances to an area (attraction) for which a waiting line is formed is one. Thus, a case where a plurality of entrances are provided to one area is not mentioned in Patent Document 1.

The present invention is made in view of the above problem, and one of objects of the present invention is to provide a technique for reducing a difference in lengths of waiting lines each formed at each of a plurality of entrances provided to one area.

Solution to Problem

A control apparatus according to the present invention includes 1) an index value computation unit that computes, for each of a plurality of gates for entering a specific area, a waiting time index value indicating a length of waiting time for using the gate, and 2) an output control unit that detects, from among the plurality of gates, a first gate and a second gate of which relation between the waiting time index values satisfies a first criterion, and causes a terminal associated with the first gate to output priority use information, which allows prioritized use of the second gate. The waiting time index value of the first gate is greater than the waiting time index value of the second gate.

A control method according to the present invention is executed by a computer. The control method includes 1) an index value computation step of computing, for each of a plurality of gates for entering a specific area, a waiting time index value indicating a length of waiting time for using the gate, and 2) an output control step of detecting, from among the plurality of gates, a first gate and a second gate of which relation between the waiting time index values satisfies a first criterion, and causing a terminal associated with the first gate to output priority use information, which allows prioritized use of the second gate. The waiting time index value of the first gate is greater than the waiting time index value of the second gate.

A program according to the present invention causes a computer to execute the control method according to the present invention.

Advantageous Effects of Invention

The present invention provides a technique for reducing a difference in lengths of waiting lines each formed at each of a plurality of entrances provided to one area.

DESCRIPTION OF EMBODIMENTS

In the following, an example embodiment according to the present invention is described with reference to the drawings. Note that, in all the drawings, a similar component is assigned with a similar reference sign, and description thereof is omitted as appropriate. Further, unless otherwise explained, in each block diagram, each block indicates a functional unit configuration rather than a hardware unit configuration. In the following description, unless otherwise explained, various predetermined values (threshold value and the like) are store in advance in a storage apparatus accessible from a functional component that uses the values.

Example Embodiment 1

<Outline>

Figure 1:
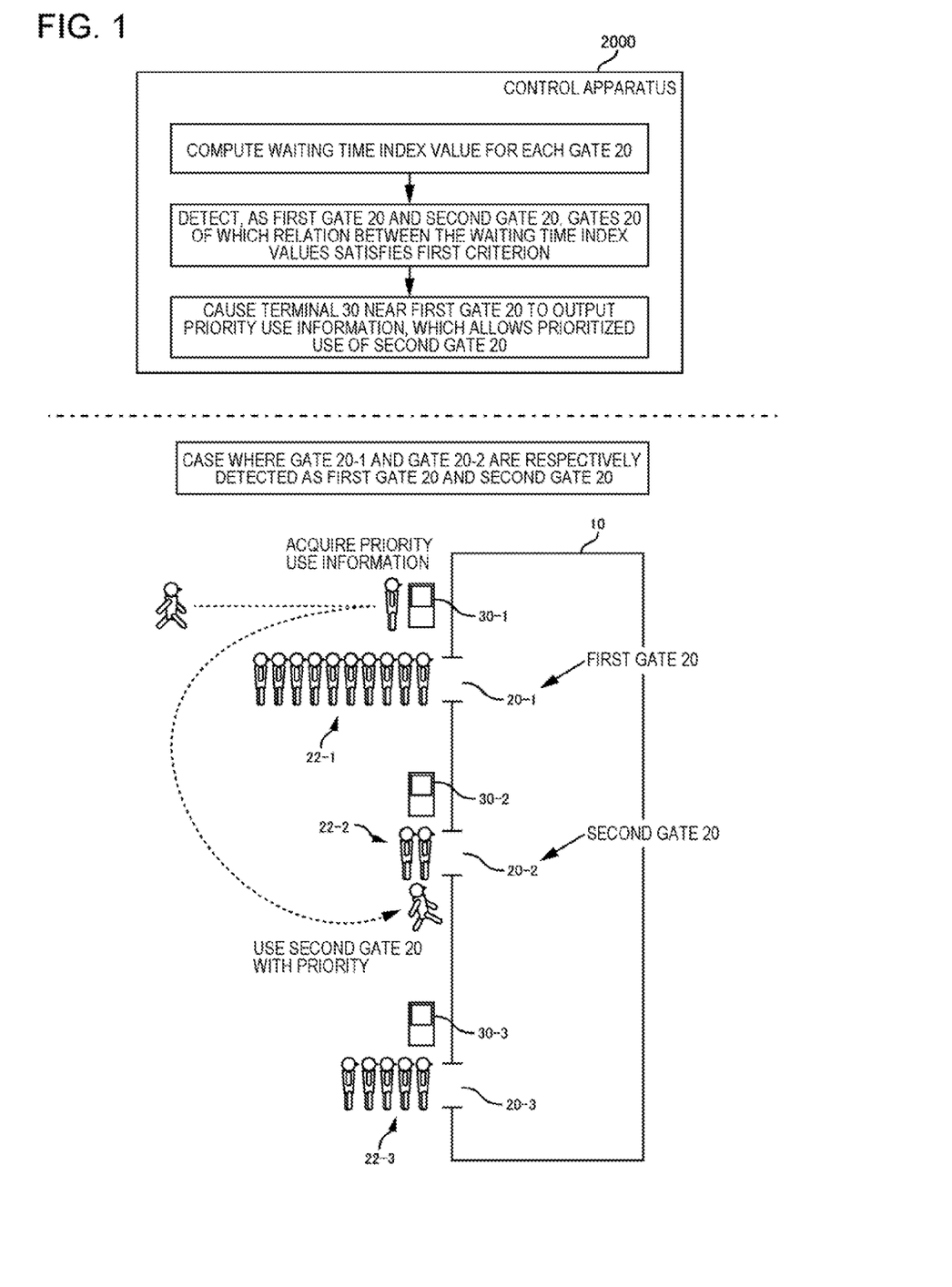
FIG. 1 is a diagram conceptually illustrating an operation of a control apparatus according to an example embodiment 1.

FIG. 1 is a diagram conceptually illustrating an operation of a control apparatus 2000 according to an example embodiment 1. Herein, the operation of the control apparatus 2000 described by using FIG. 1 is an example to facilitate understanding of the control apparatus 2000, and does not limit an operation of the control apparatus 2000. Details and variations of an operation of the control apparatus 2000 is described later.

The control apparatus 2000 is used for controlling a length of a waiting line at a gate 20 regarding an area 10. The gate 20 is an entrance for entering the area 10. A plurality of gates 20 are provided to the area 10. A user of the area 10 enters the area 10 through any one of the gates 20.

For example, the area 10 is a security area in an airport, and the like. However, the area 10 may be an area being provided with the plurality of gates 20, and is not limited to a security area in an airport.

At each of the plurality of gates 20, a waiting line 22 of users who enter the area 10 through the gate 20 is formed. At this occasion, it is possible that a length of the waiting line 22 (specifically, a length of waiting time) varies significantly from gate 20 to gate 20. Consequently, a problem such as that a user in a long waiting line 22 becomes discontented may be occur. Thus, it is desirable that lengths of the waiting lines 22 can be leveled among the waiting lines 22.

Then, the control apparatus 2000 performs the following processing in order to reduce a difference in lengths of the waiting lines 22. The control apparatus 2000 computes, for each of the gates 20, an index value (hereinafter, referred to as a waiting time index value) indicating a length of waiting time in a waiting line 22 for the gate 20. For example, a waiting line index value indicates a predicted value of waiting time length (a length of time required until using the gate 20 from joining a tail of the waiting line 22). In addition, for example, the waiting line index value may indicate the number of users included in the waiting line 22.

The control apparatus 2000 detects a first gate 20 and a second gate 20 of which relation between their waiting line index values satisfies a predetermined first criterion. For example, the first criterion is a criterion that "a difference in waiting line index values is equal to or greater than a predetermined value". One gate 20 with a greater waiting line index value is referred to as the first gate 20, and another gate 20 with a smaller waiting line index value is referred to as the second gate 20. In FIG. 1, a case where a gate 20-1 and a gate 20-2 are respectively detected as the first gate 20 and the second gate 20 is illustrated.

Since the waiting line index value of the first gate 20 is greater than the waiting line index value of the second gate 20, when at least some persons who are going to use the first gate 20 are induced in such a way as to use the second gate 20 instead of the first gate 20, it is possible to reduce a difference in lengths of waiting lines between the first gate 20 and the second gate 20. Thus, the control apparatus 2000 causes a terminal 30 (terminal 30-1 in FIG. 1) associated with the first gate 20 to output information (hereinafter, priority use information) that allows prioritized use of the second gate 20. A gate 20 is associated in advance with a terminal 30 provided near the gate 20. A user who has acquired the priority use information use the priority use information at the second gate 20, and can thereby use the second gate 20 earlier than a case where the user waits at a tail of the waiting line 22 of the second gate 20. In this way, an incentive to use the second gate 20 instead of the first gate 20 is given to a person who is going to use the first gate 20. Consequently, it is conceived that at least some persons who are going to use the first gate 20 can be induced to use the second gate 20, and therefore a difference in lengths of the waiting lines between the waiting line of the first gate 20 and the waiting line of the second gate 20 can be reduced.

In the following, the control apparatus 2000 is described in more detail.

Functional Configuration Example

Figure 2:
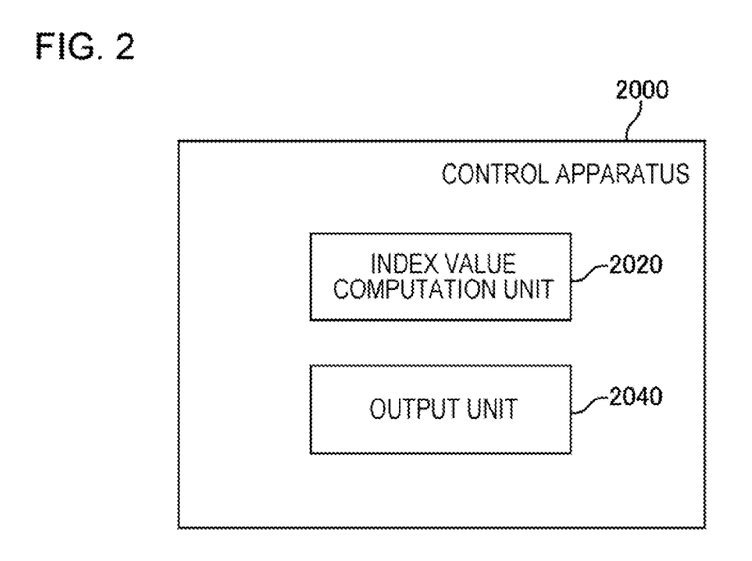
FIG. 2 is a block diagram illustrating a functional configuration of the control apparatus.

FIG. 2 is a diagram illustrating a functional configuration of the control apparatus 2000. The control apparatus 2000 includes an index value computation unit 2020 and an output unit 2040. The index value computation unit 2020 computes, for each of the plurality of gates 20 for entering the area 10, a waiting line index value indicating a length of waiting time in a waiting line 22 for the gate 20. The output unit 2040 detects the first gate 20 and the second gate 20 of which relation between their waiting time index values satisfies the first criterion. Further, the output unit 2040 causes the terminal 30 associated with the first gate 20 to output priority use information, which allows prioritized use of the second gate 20.

<Example of Hardware Configuration of Control Apparatus 2000>

Each of functional components of the control apparatus 2000 may be achieved by using hardware (e.g., a hardwired electronic circuit and the like) achieving each of the functional components, or by using a combination of hardware and software (e.g., a combination of an electronic circuit and a program that controls the electronic circuit, and the like). In the following, a case where each of the functional components of the control apparatus 2000 is achieved by a combination of hardware and software is further described.

Figure 3:
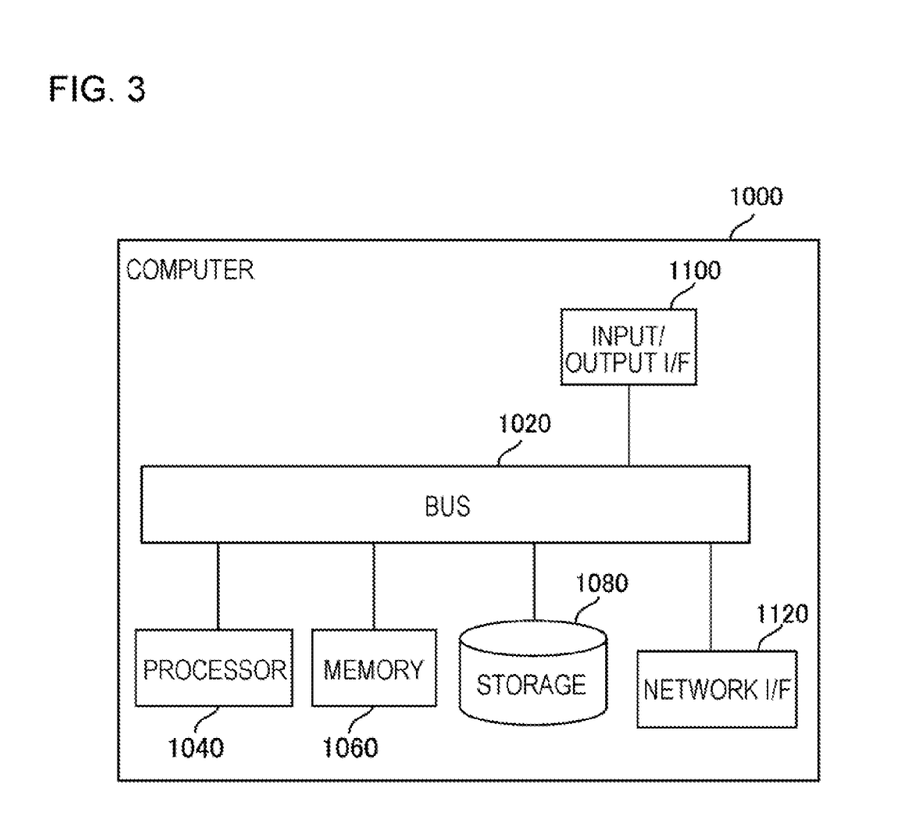
FIG. 3 is a diagram illustrating a computer for achieving the control apparatus.

FIG. 3 is a diagram illustrating a computer 1000 for achieving the control apparatus 2000. The computer 1000 is an arbitrary computer. For example, the computer 1000 is a stationary computer such as a personal computer (PC) and a server machine. In another example, the computer 1000 is a portable computer such as a smartphone and a tablet terminal.

The computer 1000 may be a dedicated computer being designed in order to achieve the control apparatus 2000, or may be a general-purpose computer. In the latter case, for example, by installing a predetermined application on the computer 1000, the computer 1000 achieves each function of the control apparatus 2000. The application is configured of a program for achieving the functional components of the control apparatus 2000.

The computer 1000 includes a bus 1020, a processor 1040, a memory 1060, a storage device 1080, an input/output interface 1100, and a network interface 1120. The bus 1020 is a data transmission path for the processor 1040, the memory 1060, the storage device 1080, the input/output interface 1100, and the network interface 1120 to transmit/receive data to/from one another. However, a method of connecting the processor 1040 and the like to one another is not limited to bus connection.

The processor 1040 is a processor of various types, such as a central processing unit (CPU), a graphics processing unit (GPU), or a field-programmable gate array (FPGA). The memory 1060 is a main storage apparatus achieved by using a random access memory (RAM) or the like. The storage device 1080 is an auxiliary storage apparatus achieved by a hard disk, a solid state drive (SSD), a memory card, a read only memory (ROM), or the like.

The input/output interface 1100 is an interface for connecting the computer 1000 to an input/output device. For example, an input apparatus such as a keyboard and an output apparatus such as a display apparatus are connected to the input/output interface 1100.

The network interface 1120 is an interface for connecting the computer 1000 to a communication network. The communication network is, for example, a local area network (LAN) or a wide area network (WAN). For example, the computer 1000 is connected to each terminal 30 via the network interface 1120.

The storage device 1080 stores a program that achieves each of the functional components of the control apparatus 2000 (a program that achieves the above-described application). By reading the program into the memory 1060 and executing the program, the processor 1040 achieves each of the functional components of the control apparatus 2000.

<Processing Flow>

Figure 4:
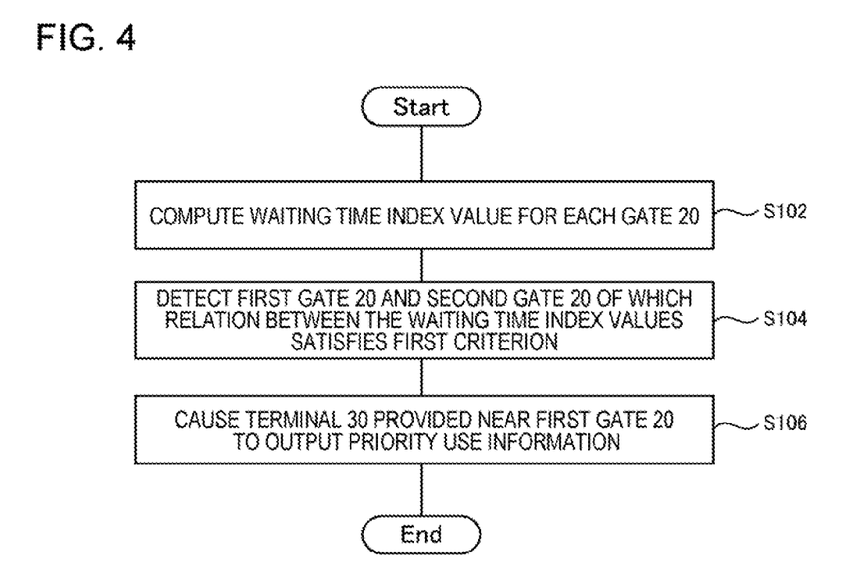
FIG. 4 is a flowchart illustrating a flow of processing executed by the control apparatus according to the example embodiment 1.

FIG. 4 is a flowchart illustrating a flow of processing executed by the control apparatus 2000 according to the example embodiment 1. The index value computation unit 2020 computes a waiting time index value for each gate 20 (S102). The output unit 2040 detects, from among the plurality of gates 20, the first gate 20 and the second gate 20 of which relation between their waiting time index values satisfies the first criterion (S104). The output unit 2040 causes the terminal 30 associated with the first gate 20 to output priority use information, which allows prioritized use of the second gate 20 (S106).

<Computation of Waiting Time Index Value: S102>

The index value computation unit 2020 computes, for each of the gates 20, a waiting time index value of a waiting line 22 for the gate 20 (S102). For example, the waiting time index value of the waiting line 22 is a predicted value of waiting time in waiting line 22. Herein, a pre-existing technique may be used as a specific technique for computing the predicted value of waiting time in a waiting line. For example, a throughput of the gate 20 (the number of persons passing through the gate 20 per unit time) is computed in advance from past performance data. Then, on the basis of the number of users currently included in the waiting line 22 and the throughput of the gate 20, a time required before all the users currently included in the waiting line 22 pass through the gate 20 is computed, and the computed time is regarded as the predicted value of waiting time in the waiting line 22.

In another example, the waiting time index value of the waiting line 22 is the number of users included in the waiting line 22. The number of users included in the waiting line 22 may be a measured value or a predicted value. Herein, a pre-existing technique may be used as a technique for computing a measured value or a predicted value of the number of users included in a waiting line. The measured value can be computed, for example, by detecting each person included in the waiting line 22 from an image generated by capturing the waiting line 22 with a camera, and counting the number of the detected persons. The predicted value can be computed, for example, based on a distance from a head of the waiting line 22 to a tail of the waiting line 22 being computed by analyzing an image acquired by capturing the waiting line 22 (for example, the predicted value can be computed by multiplying the number of persons per predetermined unit distance by the computed distance).

The index value computation unit 2020 acquires information used to compute the waiting time index value by using any method. In a case where an image capturing the waiting line 22 is used, for example, the index value computation unit 2020 receives an image transmitted from a camera that has captured the waiting line 22, or acquires an image stored in a storage apparatus in the camera by accessing the camera. Further, in a case where a camera stores an image in an external storage apparatus, the index value computation unit 2020 accesses the external storage apparatus and acquires the image.

<Detection of First Gate 20 and Second Gate 20: S104>

The output unit 2040 detects, from among the plurality of gates 20, the first gate 20 and the second gate 20 of which relation between their waiting time index values satisfies the first criterion (S104). For example, the output unit 2040 compares, for each pair of any two gates 20 that can be extracted from the plurality of gate 20, waiting time index values computed for the gates 20 that composing the pair with each other, and thereby determines whether a relation between the waiting time index values satisfies the first criterion. In this way, a pair that satisfies the first criterion is detected. Of the two gates 20 composing the detected pair, one gate 20 with a greater waiting time index value is handled as the first gate 20, and the other gate 20 with a smaller waiting time index value is handled as the second gate 20. Note that, when there is a gate 20 being already handled as the first gate 20 or the second gate 20 in the plurality of gate 20 (when there is a gate 20 being already detected as the first gate 20 or the second gate 20 by the control apparatus 2000 in a previous processing), it is suitable that the gate 20 is excluded from detection targets.

The first criterion includes, for example, as described above, "a difference in waiting time index values is equal to or greater than a first threshold value". By using such a first criterion, leveling of waiting line lengths is performed for two gates 20 that differ to a certain degree or more from each other in magnitude of waiting time. Thus, an advantageous effect of the leveling of waiting line lengths by the control apparatus 2000 can be increased.

Further, the first criterion may include that "time required to travel between gates 20 is equal to or less than a second threshold value". In this way, increasement in a burden on a user being required to travel can be prevented, and a result that "a user could have entered the area 10 earlier when the user had waited in the first gate 20 because it took a long time to travel from the first gate 20 to the second gate", which is undesirable for the user, can be prevented.

The second threshold value may be fixed in advance, or dynamically determined based on a difference between two waiting time index values to be compared. In the latter case, for example, the difference between the two waiting time index values to be compared is set as the second threshold value.

Herein, a method of detecting the gates 20 of which waiting time index values satisfy the first criterion is not limited to a method of comparing waiting time index values of each pair of any two gates 20, as described above. For example, the output unit 2040 selects, from among the plurality of the gates 20, a gate 20 as a candidate for the first gate 20 in order from a gate 20 having a greatest waiting time index value. Further, the output unit 2040 searches for a gate 20 that satisfies the first criterion between the gate 20 selected as the candidate for the first gate 20 and the gate 20 in order from a gate 20 having a smallest waiting time index value. When the gate 20 that satisfies the first criterion between the gate 20 selected as the candidate for the first gate 20 and the gate 20 is detected as a search result, the output unit 2040 handles a pair of "the gate 20 selected as the candidate for the first gate 20 and the detected gate 20" as a pair of the first gate 20 and the second gate 20. When two or more pairs of the first gate 20 and the second gate 20 are to be detected, the output unit 2040 repeats similar processing for the remaining gates 20 excluding the detected gates 20.

Herein, it is conceivable that there are a plurality of gates 20 that satisfy the first criterion between a certain gate 20 and another gate 20. For example, it is conceivable that a plurality of gates 20 (the gate 20 having the smallest waiting time index value, the gate 20 having the second smallest waiting time index value, . . . ) that satisfy the first criterion that "a difference between waiting time index values is equal to or greater than the first threshold value" between the gate 20 having the greatest waiting time index value and the gate 20 are detected. In other words, in this case, there are a plurality of candidates for the second gate 20, with respect to the first gate 20. In such a case, the index value computation unit 2020 selects, from among the plurality of candidates for the second gate 20, a gate 20 to be handled as the second gate 20, based on a predetermined rule.

As the predetermined rule, various rules can be employed. For example, as the predetermined rule, a condition that "a difference between the waiting time index values is maximum" is employed. In this case, from among the plurality of candidates for the second gate 20, the gate 20 having the smallest waiting time index value is selected as the second gate 20. In another example, as the predetermined rule, a condition that "travel time between the gates 20 is minimum" is employed. In another example, as the predetermined rule, a condition that "a sum of travel time between gates 20 and travel time from the gate 20 to be used to a destination is minimum" is employed. For example, in a case where the area 10 is a security area in an airport, the destination can be a boarding gate.

In another example, an estimation model that estimates, in response to an input of information (a location, a waiting time index value, and the like) related to two gates 20, a recommendation degree of handling the two gates 20 as a pair of the first gate 20 and the second gate 20 may be defined in advance. In this case, a predetermined rule that "a recommendation degree being output by the estimation model is maximum" can be used. Note that, the estimation model is learned in advance by using training data.

Note that, it is also possible that there are a plurality of candidates for the first gate 20, with respect to the second gate 20. In this case, the output unit 2040 selects one gate 20 to be handled as the first gate 20. A method thereof is similar to the above-described method using a predetermined rule.

<Priority Use Information>

Priority use information is information that allows prioritized use of a specific gate 20 (the second gate 20). For example, it is conceivable that, by showing a paper medium on which the priority use information is printed to an attendant at a targeted gate 20, a user is able to use the gate 20 without lining up in a waiting line 22 for the gate 20. Other usage method is described below.

For example, the priority use information includes identification information of a usable gate 20 (the second gate 20). The identification information of the gate 20 is, for example, a gate number. In addition, for example, the priority use information may include a time of issue, identification information of an issuing-source gate (the first gate 20), an expiration date and time, and the like. When an expiration date and time is included in the priority use information, the priority use information cannot be used after the expiration date and time.

<Output of Priority Use Information: S106>

There are various methods in which the output unit 2040 outputs the priority use information. For example, the output unit 2040 causes a display apparatus 32 of the terminal 30 associated with the first gate 20 to display a code encoding the priority use information. A user acquires the priority use information by reading the code with the user's own mobile terminal and the like.

In another example, the output unit 2040 causes a printer 34 of the terminal 30 associated with the first gate 20 to print the priority use information on a portable medium (a paper card and the like), and thereby the portable medium is output from the printer 34. A user acquires the priority use information by acquiring the portable medium.

In another example, by causing wireless communication between the terminal 30 associated with the first gate 20 and the user's mobile terminal, the output unit 2040 may transmit the priority use information from the terminal 30 to a user's mobile terminal. Likewise, by causing wireless communication between the terminal 30 and an IC chip (for example, an IC chip embedded in a card medium) possessed by a user, and thereby the priority use information may be stored in a storage apparatus of the IC chip.

Information indicating association between the gate 20 and the terminal 30 is stored in advance in a storage apparatus being accessible from the output unit 2040. By using this information, the output unit 2040 determines the terminal 30 being associated in advance with the first gate 20, and causes the terminal 30 to output the priority use information.

<Output Period of Priority Use Information>

When a pair of the first gate 20 and the second gate 20 is detected by the above-described processing, the terminal 30 associated with the first gate 20 continues to be in a state in which the priority use information is continuously output or a state in which output of the priority use information is possible (a state waiting to output), while a second criterion is satisfied. A state in which the priority use information is continuously output is, for example, a state in which a code that indicates the priority use information continues to be displayed on the display apparatus 32. Further, a state in which output of the priority use information is possible is, for example, "a state in which a portable medium on which the priority use information is printed is output when a button provided on the terminal 30 is pressed", "a state in which the priority use information is transmitted from the terminal 30 to a user's mobile terminal when the user's mobile terminal approaches the terminal 30", or the like.

As the second criterion, for example, "a difference between waiting time index values is smaller than a third threshold value" can be employed. The third threshold value may be the same as the above-described first threshold value, or may be different from the first threshold value. In the former case, satisfying the second criterion is synonymous with not satisfying the first criterion. Specifically, when two gates 20 of which relation between their waiting time index values satisfies the first criterion are detected, whether the two gates 20 satisfy the first criterion is regularly determined, and when the first criterion is no longer satisfied, the priority use information is no longer output.

<Method of Using Priority Use Information>

A user who has acquired priority use information uses the second gate 20 by using the priority use information. For example, a user can use the second gate 20 with priority by showing the priority use information to an attendant or the like near the second gate 20. In another example, a terminal (hereinafter, a reader terminal) that reads the priority use information may be provided near the second gate 20, and a user may use the gate 20 with priority by causing the reader terminal to read the priority use information. More specifically, the gate 20 is provided with a partition or the like that opens by causing the reader terminal to read the priority use information. A user opens a partition by causing the reader terminal to read the priority use information and, and passes through the gate 20.

Note that, a user who has acquired the priority use information may line up in a dedicated line being separated from the waiting line 22, or line up in the waiting line 22. In the latter case, for example, when lining up in the waiting line 22, a user provided the priority use information to an attendant. In response, the attendant guides the user to a predetermined position in the waiting line 22.

<Method of Causing User to Identify Second Gate 20>

It is suitable that a user who has acquired the priority use information can easily recognize the gate 20 (specifically, the second gate 20) being usable by using the priority use information. For example, identification information of the second gate 20 is displayed on the portable medium on which the priority use information is printed. Likewise, the identification information of the second gate 20 is displayed on a display apparatus of a mobile terminal of a user who has acquired the priority use information. Further, when the display apparatus 32 is provided in the terminal 30 that has output the priority use information, the identification information of the second gate 20 is displayed on the apparatus 32.

A part or the entirety of the above-described example embodiment can be described as the following supplementary notes, but is not limited thereto.

1. A control apparatus including:
   an index value computation unit that computes, for each of a plurality of gates for entering a specific area, a waiting time index value indicating a length of waiting time for using the gate; and
   an output control unit that detects, from among the plurality of gates, a first gate and a second gate of which relation between the waiting time index values satisfies a first criterion, and causes a terminal associated with the first gate to output priority use information, which allows prioritized use of the second gate,
   wherein the waiting time index value of the first gate is greater than the waiting time index value of the second gate.
2. The control apparatus according to supplementary note 1, wherein
   the waiting time index value is waiting time for the gate, or a number of persons in a waiting line for the gate.
3. The control apparatus according to supplementary note 1 or 2, wherein
   the first criterion includes that a difference between the waiting time index values is equal to or greater than a threshold value.
4. The control apparatus according to supplementary note 3, wherein
   the first criterion further includes that travel time from the first gate to the second gate is equal to or less than a threshold value.
5. The control apparatus according to any one of supplementary notes 1 to 4, wherein
   the output control unit causes
       a display apparatus associated with the first gate to display a code for reading the priority use information,
       a printer associated with the first gate to output a medium on which the priority use information is printed, or
       a communication terminal associated with the first gate to transmit the priority use information to a user's mobile terminal.
6. A control method executed by a computer, including:
   an index value computation step of computing, for each of a plurality of gates for entering a specific area, a waiting time index value indicating a length of waiting time for using the gate; and
   an output control step of detecting, from among the plurality of gates, a first gate and a second gate of which relation between the waiting time index values satisfies a first criterion, and causing a terminal associated with the first gate to output priority use information, which allows prioritized use of the second gate,
   wherein the waiting time index value of the first gate is greater than the waiting time index value of the second gate.
7. The control method according to supplementary note 6, wherein
   the waiting time index value is waiting time for the gate, or a number of persons in a waiting line of the gate.
8. The control method according to supplementary note 6 or 7, wherein
   the first criterion includes that a difference between the waiting time index values is equal to or greater than a threshold value.
9. The control method according to supplementary note 8, wherein
   the first criterion further includes that travel time from the first gate to the second gate is equal to or less than a threshold value.
10. The control method according to any one of supplementary notes 6 to 9, including,
    in the output control step,
        causing a display apparatus associated with the first gate to display a code for reading the priority use information,
        causing a printer associated with the first gate to output a medium on which the priority use information is printed, or
        causing a communication terminal associated with the first gate to transmit the priority use information to a user's mobile terminal.
11. A program for causing a computer to execute the control method according to any one of supplementary notes 6 to 10.

REFERENCE SIGNS LIST

10 Area
20 Gate
22 Waiting line
30 Terminal
32 Display apparatus
34 Printer
1000 Computer
1020 Bus
1040 Processor
1060 Memory
1080 Storage device
1100 Input/output interface
1120 Network interface
2000 Control apparatus
2020 Index value computation unit
2040 Output unit

What is claimed is:
1. A control apparatus comprising:
   at least one memory configured to store instructions; and
   at least one processor configured to execute the instructions to perform operations comprising:

computing, for each of a plurality of gates for entering a specific area, a waiting time index value indicating a length of waiting time for using the gate;
detecting, from among the plurality of gates, a first gate and a second gate of which relation between the waiting time index values satisfies a first criterion; and
causing a terminal associated with the first gate to output priority use information, which allows prioritized use of the second gate, wherein
the waiting time index value of the first gate is greater than the waiting time index value of the second gate, and
the detecting the first gate and the second gate comprises at least one of:
  comparing, for each pair of any two gates that can be extracted from the plurality of gates, waiting time index values computed for the gates that composing the pair with each other, and thereby determining whether a relation between the waiting time index values satisfies the first criterion, and
  selecting, from among the plurality of the gates, a candidate gate as a candidate for the first gate in order from a first one of the plurality of gates having a greatest waiting time index value of the plurality of gates, and searching for an other gate that satisfies the first criterion between the candidate gate selected as the candidate for the first gate and the other gate in order from a second one of the gates having a smallest waiting time index value of the plurality of gates.

2. The control apparatus according to claim 1, wherein the waiting time index value is waiting time for the gate, or a number of persons in a waiting line for the gate.

3. The control apparatus according to claim 1, wherein the first criterion includes that a difference between the waiting time index values is equal to or greater than a threshold value.

4. The control apparatus according to claim 3, wherein the first criterion further includes that travel time from the first gate to the second gate is equal to or less than a threshold value.

5. The control apparatus according to claim 1, wherein causing a terminal associated with the first gate to output the priority use information comprises:
  causing a display apparatus associated with the first gate to display a code for reading the priority use information;
  causing a printer associated with the first gate to output a medium on which the priority use information is printed; or
  causing a communication terminal associated with the first gate to transmit the priority use information to a user's mobile terminal.

6. The control apparatus according to claim 1, wherein in the causing the terminal associated with the first gate to output priority use information, at least one of:
  the first gate comprises a greater waiting time index value than the second gate when the relation of the first gate and the second gate satisfies the first criterion, and
  the first gate is the candidate gate and the second gate is the other gate when the relation of the first gate and the second gate satisfies the first criterion.

7. A control method executed by a computer, comprising:
computing, for each of a plurality of gates for entering a specific area, a waiting time index value indicating a length of waiting time for using the gate;
detecting, from among the plurality of gates, a first gate and a second gate of which relation between the waiting time index values satisfies a first criterion; and
causing a terminal associated with the first gate to output priority use information, which allows prioritized use of the second gate, wherein
the waiting time index value of the first gate is greater than the waiting time index value of the second gate, and
the detecting the first gate and the second gate comprises at least one of:
  comparing, for each pair of any two gates that can be extracted from the plurality of gates, waiting time index values computed for the gates that composing the pair with each other, and thereby determining whether a relation between the waiting time index values satisfies the first criterion, and
  selecting, from among the plurality of the gates, a candidate gate as a candidate for the first gate in order from a first one of the plurality of gates having a greatest waiting time index value of the plurality of gates, and searching for an other gate that satisfies the first criterion between the candidate gate selected as the candidate for the first gate and the other gate in order from a second one of the gates having a smallest waiting time index value of the plurality of gates.

8. The control method according to claim 7, wherein the waiting time index value is waiting time for the gate, or a number of persons in a waiting line of the gate.

9. The control method according to claim 7, wherein the first criterion includes that a difference between the waiting time index values is equal to or greater than a threshold value.

10. The control method according to claim 7, wherein the first criterion further includes that travel time from the first gate to the second gate is equal to or less than a threshold value.

11. The control method according to claim 7, wherein causing a terminal associated with the first gate to output the priority use information comprises:
  causing a display apparatus associated with the first gate to display a code for reading the priority use information;
  causing a printer associated with the first gate to output a medium on which the priority use information is printed; or
  causing a communication terminal associated with the first gate to transmit the priority use information to a user's mobile terminal.

12. The control method according to claim 7, wherein in the causing the terminal associated with the first gate to output priority use information, at least one of:
  the first gate comprises a greater waiting time index value than the second gate when the relation of the first gate and the second gate satisfies the first criterion, and
  the first gate is the candidate gate and the second gate is the other gate when the relation of the first gate and the second gate satisfies the first criterion.

13. A non-transitory storage medium storing a program for causing a computer to execute a control method, the control method comprising:
computing, for each of a plurality of gates for entering a specific area, a waiting time index value indicating a length of waiting time for using the gate;

detecting, from among the plurality of gates, a first gate and a second gate of which relation between the waiting time index values satisfies a first criterion; and causing a terminal associated with the first gate to output priority use information, which allows prioritized use of the second gate, wherein the waiting time index value of the first gate is greater than the waiting time index value of the second gate, and the detecting the first gate and the second gate comprises at least one of:
- comparing, for each pair of any two gates that can be extracted from the plurality of gates, waiting time index values computed for the gates that composing the pair with each other, and thereby determining whether a relation between the waiting time index values satisfies the first criterion, and
- selecting, from among the plurality of the gates, a candidate gate as a candidate for the first gate in order from a first one of the plurality of gates having a greatest waiting time index value of the plurality of gates, and searching for an other gate that satisfies the first criterion between the candidate gate selected as the candidate for the first gate and the other gate in order from a second one of the gates having a smallest waiting time index value of the plurality of gates.

14. The non-transitory storage medium according to claim 13, wherein
the waiting time index value is waiting time for the gate, or a number of persons in a waiting line of the gate.

15. The non-transitory storage medium according to claim 13, wherein
the first criterion includes that a difference between the waiting time index values is equal to or greater than a threshold value.

16. The non-transitory storage medium according to claim 13, wherein
the first criterion further includes that travel time from the first gate to the second gate is equal to or less than a threshold value.

17. The non-transitory storage medium according to claim 13, wherein
causing a terminal associated with the first gate to output the priority use information comprises:
- causing a display apparatus associated with the first gate to display a code for reading the priority use information;
- causing a printer associated with the first gate to output a medium on which the priority use information is printed; or
- causing a communication terminal associated with the first gate to transmit the priority use information to a user's mobile terminal.

18. The non-transitory storage medium according to claim 13, in the causing the terminal associated with the first gate to output priority use information, at least one of:
- the first gate comprises a greater waiting time index value than the second gate when the relation of the first gate and the second gate satisfies the first criterion, and
- the first gate is the candidate gate and the second gate is the other gate when the relation of the first gate and the second gate satisfies the first criterion.

* * * * *